United States Patent Office 2,698,807
Patented Jan. 4, 1955

2,698,807

COATING COMPOSITIONS CONTAINING ETHYL CELLULOSE AND A PROCESS OF MAKING THE SAME

Annis G. Asaff, Auburndale, Mass., assignor to Callaghan Hession Corporation, Boston, Mass., a corporation of Massachusetts No Drawing. Application January 10, 1951, Serial No. 205,418

6 Claims. (Cl. 106—170)

This invention relates to coating compositions suitable for use as protective or decorative coatings for floors, walls and the like, and in particular it comprises a new and useful coating composition containing ethyl cellulose, and a process for making the same.

Ethyl cellulose possesses many desirable characteristics as a film forming material, such as thermal and chemical stability, moisture resistance and dimensional stability. However ethyl cellulose has not been used extensively in coating compositions because the high viscosity and stickiness of its solutions make it very difficult to spread, either by means of a trowel or by brush. In the copending application of the present inventor and William W. Donelson, Serial No. 783,858, filed November 3, 1947, there are described coating compositions containing ethyl cellulose whose are readily spreadable by means of a trowel or brush. The compositions described in said application comprise ethyl cellulose, along with plasticizer and fortifying and extending resins, dissolved in a mixture of liquid aromatic hydrocarbons and lower aliphatic alcohols, suitable aggregate filler material and a small amount of water to effect a partial deactivation of the solvent and cause a thickening of the mixture which renders it sufficiently non-sticky to be brushed or troweled in providing a relatively thin coating. The deactivation of the solvent by the addition of a small amount of water also allows coats of the composition to be applied over previous coats without dissolving them.

The product of this invention constitutes an improvement over the compositions described in the above application, and provides a coating composition which is completely non-sticky yet viscous to the point of being gelacious and which can be applied by a trowel without sticking thereto in thicker layers than have heretofore been practical. The coating composition provided by this invention hardens for ordinary use in a relatively short time, and it may be applied either with or without the inclusion of aggregate filler, plasticizers, fortifying and extending resins and the like.

The improved coating composition of this invention comprises a cohesive, non-sticky, plastic and gelacious vehicle prepared by adding to a solution of ethyl cellulose in a mixture of aromatic liquid hydrocarbons and water-miscible solvents sufficient water to cause a two phase separation, the heavier ethyl cellulose-containing phase constituting the vehicle. If desired, there may be incorporated in the ethyl cellulose solution, preferably prior to the addition of water, materials to modify the physical properties of the coating, such as aggregate fillers, plasticizers, fortifying and extending resins, stabilizers and pigments, but these additions are not essential to this invention in its basic form.

The solvent in which the ethyl cellulose is first dissolved must contain a substantial proportion, at least 20 per cent by weight, of a water-miscible solvent for ethyl cellulose to render the solution responsive to the addition of water. A liquid aromatic hydrocarbon is preferably also included in the solvent mixture. The aromatic hydrocarbon has only a limited solvent action on the ethyl cellulose, and its presence appears to impart a desirable degree of viscosity to the gel which is formed when sufficient water has been added to cause the two phase separation and the removal of part of the water-miscible solvent from the ethyl cellulose phase and also to impart greater strength to the final dry film. Preferred water-miscible solvents include the lower aliphatic alcohols, methanol, ethanol, and normal and isopropanol, and the lower aliphatic ketones, acetone and methyl ethyl ketone, but any liquid which readily dissolves ethyl cellulose and which is water-miscible may be used. Preferred liquid aromatic hydrocarbons include benzene, toluene and xylene and other water-immiscible aromatic hydrocarbons having a limited solvent effect on ethyl cellulose. The solvent may contain as much as 80 per cent by weight of the aromatic hydrocarbon. Higher concentrations of the aromatic hydrocarbon in the solvent cause the formation of plastic gels which are too sticky for practical use, being more adhesive than cohesive. At about 80 per cent aromatic hydrocarbon the plastic gel is tacky, yet it can be touched without clinging to the article touching it, demonstrating that it is more cohesive than adhesive. At the other extreme the aromatic hydrocarbon may be eliminated altogether resulting, after the water has been added, in a clear, non-tacky gel which lacks the viscosity and cohesiveness present when aromatic hydrocarbon is included in the solvent. Accordingly the presence of at least a small fraction of liquid aromatic hydrocarbon is distinctly desirable since it reduces the plasticity and increases the body of the plastic gel which is formed when water is added. Varying the aromatic hydrocarbon content of the solvent mixture accordingly offers a means for varying the plasticity and cohesiveness of the plastic gel. As little as 5 per cent aromatic hydrocarbon in the solvent mixture is effective in producing a vehicle having the desired degree of viscosity and cohesiveness.

The ethyl cellulose is dissolved in the solvent mixture and may constitute from about ten to thirty per cent of the solution, depending on the desired viscosity or plasticity of the resulting vehicle and on the viscosity of the ethyl cellulose. Ethyl cellulose having a viscosity of from 20 to 100 centipoises, as determined by a viscosity measurement of a five per cent solution of the ethyl cellulose in a solvent containing eighty per cent toluene and twenty per cent ethanol, may be used, thus affording a means for varying the chemical and physical characteristics of the coating in accordance with the variations of these properties with the viscosity of the ethyl cellulose. Water is thereafter added to the ethyl cellulose solution while stirring until the mixture separates into two distinct phases. If the stirring is not violent, it may be necessary to allow the mixture to stand for a long period of time, sometimes about forty-eight hours, before the separation occurs if only the minimum amount of water has been added, but with vigorous stirring the separation occurs more rapidly, usually in a few minutes. The addition of more than a minimum amount of water accelerates the separation.

When the solution separates into two phases there results a supernatant phase which is entirely liquid and consists essentially of water and water-miscible solvent and apparently has a greater volume than the volume of water added, indicating that some of the organic solvents are present in the supernatant phase in addition to the water. It is believed that some of the water becomes dissolved in the water-miscible solvent that is present in the viscous gel phase. The viscous gel is entirely coherent, and plastic and upon stirring, the viscous material which had adhered to the sides of the container slides or falls away and becomes incorporated into the viscous gel comprising the vehicle of this invention, leaving the container walls clean. The vehicle may be removed from the supernatant liquid and readily spread by a trowel or spatula on a surface, preferably a porous or rough surface, as a continuous smooth-surface coating which may be slightly tacky, but which has no tendency to stick or adhere to the trowel it being more cohesive than adhesive. After a layer about one-eighth inch thick has commenced to dry, the coating beings to acquire adhesive properties rapidly so that by the time it is dry it is strongly adherent to the surface upon which it has been applied.

The amount of water required to effect the two phase separation varies with the nature and amount of water-miscible solvent in the solvent-mixture, the amount of ethyl cellulose in the solution, and the nature and amount of other materials added to the solution to impart desired characteristics to the coating. Solutions containing about twenty per cent by weight of ethyl cellulose and no other materials other than the solvent required from about twelve to fifty per cent of their weight of water, larger amounts being needed when the solvent is high in water-miscible solvent content than when it is high in aromatic hydrocarbon content. Solutions containing lower amounts of ethyl cellulose have been found to require more water, and solutions containing higher amounts of ethyl cellulose less water. The presence of other resinous materials in solution with the ethyl cellulose generally reduces the amount of water required, and the presence of aggregate filler material suspended in the solution generally increases the quantity of water required. Accordingly, the amount of water required can only be defined as an amount sufficient to effect a two phase separation of the ethyl cellulose solution. Preferably a small amount of water in excess of the required amount is added to accelerate the separation. An excess of about ten per cent is considered adequate, although larger excesses may be used if desired.

Preferred coating compositions contain, in addition to the ethyl cellulose and solvent mixture, fortifying extenders, plasticizer, stabilizer and aggregate filler. Fortifying extenders include various resins that are compatible with ethyl cellulose and the plasticizer and have solubility characteristics, with respect to the solvent mixture and water, similar to those of ethyl cellulose. They are included to toughen the ethyl cellulose film and to reduce the amount of ethyl cellulose required to produce a coating having the desired thickness and plasticity. They include rosin derivatives such as rosin, partially polymerized rosin, ester gum and calcium and zinc resinate. The petroleum hydrocarbon-insoluble hard, high melting point resin extracted, after the separation of refined rosin, from the resinous material extracted from pine wood known as "Vinsol" may also be used.

Plasticizers for ethyl cellulose which may be used in the improved coating composition of this invention include tricresyl phosphate, triphenyl phosphate, tribenzyl phosphate, butyl stearate, dihydro-methyl abietate, chorinated diphenyl, mixtures thereof and equivalent materials. A preferred plasticizer is chlorinated diphenyl having a pour point (ASTM) of 8.0 to 12.0° C., a distillation range (ASTM) of 365 to 390° C., a specific gravity of 1.495 to 1.505, and a viscosity of 42 to 45 Saybolt seconds at 98.9° C.

Aggregate filler material and pigments may be incorporated to improve the wearing qualities of the coating, make it applicable in thicker coats and to modify the appearance and color thereof. Suitable aggregate fillers include sand, mica, sawdust, corkdust, marble chips, pigments and innumerable other aggregate or granular materials. The amount that may be incorporated in the composition depends on the bulk density and absorbent qualities of the particular material selected, and may amount to about 400 per cent, based on the weight of the vehicle, for heavy, non-absorbent fillers such as sand.

The above mentioned additional ingredients are preferably mixed with the solution prior to the addition of water.

The following examples are representative of the range of solvent mixtures that may be used, and are set forth as exemplary rather than by way of limitation. Ethanol and isopropanol have been selected as preferred examples of the water-miscible solvent, and xylene has been selected as the preferred liquid aromatic hydrocarbon.

EXAMPLE 1

| | Grams |
|---|---|
| Ethyl cellulose, 22 cp | 22 |
| Xylene | 54.6 |
| Ethanol | 23.4 |

The solvent mixture contains 70 per cent by weight of xylene. The ethyl cellulose and solvents at room temperature are placed in a container and stirred to facilitate dissolution. Thereafter water is added slowly, while stirring, until the solution separates into two phases. The amount of water required was found to be 13.1 grams, and it required forty-eight hours for the separation to occur after mild stirring. The ethyl cellulose phase separated as a cohesive viscous plastic gelatinous mass having a white color. It could readily be spread on a wood surface by means of a trowel and had no tendency to stick to the trowel. On drying it first became tacky, but not sticky, and within twelve hours formed a clear hard film of ethyl cellulose.

EXAMPLE 2

| | Grams |
|---|---|
| Ethyl cellulose, 22 cp | 22 |
| Xylene | 40.1 |
| Ethanol | 37.8 |

The solvent here contains 51.5 per cent xylene. The compounds were treated as in Example 1, and water added slowly while stirring, the amount required to effect the separation being 13.1 grams. A spreadable composition resulted which possessed less tack than in the preceding example. It was also less vicous and somewhat clearer.

EXAMPLE 3

| | Grams |
|---|---|
| Ethyl cellulose, 22 cp | 22 |
| Xylene | 23.4 |
| Ethanol | 54.6 |

The solvent here contains thirty per cent xylene. The compounds were mixed as in Example 1, and water was similarly added, the amount required being 13.3 grams. A trowelable composition resulted which was less tacky than either of the two preceding examples, and also less viscous and clearer.

EXAMPLE 4

| | Grams |
|---|---|
| Ethyl cellulose, 22 cp | 22 |
| Ethanol | 78 |

With a solvent consisting entirely of ethanol, the amount of water required to effect a two phase separation of the ethyl cellulose solution was 30.6 grams. The gel phase which was formed could be troweled easily, was almost completely lacking in tack and possessed cohesive properties inferior to those of the preceding examples, and it was clear throughout.

EXAMPLE 5

| | Grams |
|---|---|
| Ethyl cellulose, 22 cp | 22 |
| Iso-propanol | 78 |

The results in the above example were very similar to those of Example 4, except that 53.3 grams of water were required before a two-phase separation occured.

A composition containing a lower concentration of ethyl cellulose is demonstrated by the following example.

EXAMPLE 6

| | Grams |
|---|---|
| Ethyl cellulose, 22 cp | 11 |
| Xylene | 24 |
| Ethanol | 37.4 |
| Iso-propanol | 28.5 |

The constituent ingredients were mixed as in Example 1 and water added slowly while stirring, the amount required to effect the separation being 19.2 grams. The ethyl cellulose phase separated as a cohesive plastic mass which could be readily spread by means of a trowel without sticking thereto. It was more fluid than the composition described in Example 3, a composition having a solvent mixture containing about the same percentage of xylene as the present example.

Preferred compositions made in accordance with this invention include such additional modifying ingredients as extending resins, plasticizer, stabilizer and aggregate filler materials, as shown by the following examples.

EXAMPLE 7

| | Grams |
|---|---|
| Ethyl cellulose, 22 cp | 10 |
| Ester gum | 10 |
| Xylene | 21.4 |
| Ethanol | 33.4 |
| Iso-propanol | 25.3 |

The ingredients are mixed as in Example 1, and water added slowly while stirring. The amount required to cause the separation was found to be 14.7 grams. A composition very similar to that described in Example 3 was obtained.

EXAMPLE 8

| | Grams |
|---|---|
| Ehthyl cellulose | 10 |
| Ester gum | 10 |
| Xylene | 20.7 |
| Ethanol | 33.8 |
| Iso-propanol | 25.3 |
| Sand, 100 mesh | 22.8 |

All the ingredients except the sand are mixed as in Example 1, and the sand added thereto after the solution is formed. The water is thereafter added, the amount required being 15.6 grams. Upon the separation of the phases, the sand is retained by the ethyl cellulose phase forming a plastic mastic which is cohesive and non-sticky, and which can be applied by means of a trowel as a surface coating.

EXAMPLE 9

A. Solution:                                           Kilograms
   Ethyl cellulose, 22 cp_____ 2.5
   Ethyl cellulose, 100 cp_____ 2.5
   Ethyl cellulose sweepings_____ 5.0
   Ester gum_____ 10.0
   Chlorinated diphenyl (plasticizer)_____ 5.0
   Menthyl phenol (stabilizer)_____ .2
   Xylene_____ 21.6
   Ethanol_____ 28.2
   Iso-propanol_____ 25.0
B. Pigment:
   Titanium dioxide_____ 38.5
   Black iron oxide_____ 3.8
   Xylene_____ 15.4
   Ethanol_____ 15.4
C. Aggregate fillers:
   Sand, 100 mesh_____ 277.0
   Pulverized silicon dioxide (silex)_____ 11.5
   Mica flakes_____ 1.0
   Water_____ 18.3

The ethyl cellulose solution is formed by mixing together the ingredients listed under A until a solution is formed. The pigments are mixed with the additional quantities of xylene and ethanol listed under B, and the solution A and wet pigments ground together in a suitable grinder, for instance a Lenart mixer, for about one and one-half hours. The fillers listed under C are then mixed together and mixed into the pigmented solution. Thereafter the water is added slowly while stirring, the amount prescribed above being slightly in excess of the minimum amount required to effect a two phase separation. This composition provides a rugged flooring which is highly wear resistant and which may readily be applied over concrete, wood and similar substances. One preferred method of applying this surface coating mastic is to trowel it over a primed floor surface. The sweepings used in the above example comprise mostly fugitive ethyl cellulose which settles on the floors of ethyl cellulose plants. They provide a particularly inexpensive source of ethyl cellulose.

The alcohols and xylene used in the above examples are all commercial grades, the xylene consisting of a mixture of the ortho, meta and para isomers. The ethanol is 95 per cent pure and contains about 5 per cent water, and the iso-propanol contains from one-half to 5 per cent water. Alcohols with higher or lower water contents may be used and the amount of water required to effect the two phase separation would accordingly be decreased or increased.

In using the surface coating compositions of this invention it is preferred to combine all the ingredients including the water to form a batch of stock.

The compositions of this invention are easily applied in smooth, rapidly drying surface coatings which are durable and resistant to the action of water, heat, alkalis and acids, and which may be put into ordinary use after twelve hours after being applied.

Having thus disclosed my invention and described in detail preferred embodiments thereof so that any person skilled in the art may practice it, I claim and desire to secure by Letters Patent:

1. A plastic coating composition comprising the water-immiscible gel phase formed by adding to a solution comprising ethyl cellulose and a mixture containing less than 80 per cent by weight of liquid aromatic hydrocarbons and at least 20 per cent by weight of an alcohol selected from the group consisting of methanol, ethanol, normal propanol and isopropanol, water in an amount sufficient to effect a two phase separation.

2. A plastic coating composition comprising the water-immiscible gel phase resulting when there is added to a solution comprising ethyl cellulose and a mixture comprising from 95% to 20% by weight of water-miscible lower aliphatic alcohol selected from the group consisting of methanol, ethanol, normal propanol and isopropanol, and from 5% to 80% by weight of a liquid aromatic hydrocarbon selected from the group consisting of benzene, toluene and xylene, water in an amount sufficient to effect a two phase separation.

3. A surface coating mastic applicable by means of a trowel without adhering thereto comprising aggregate filler material incorporated and suspended in the water-immiscible gel phase formed by adding to a solution comprising ethyl cellulose and a mixture comprising water-miscible lower aliphatic alcohol selected from the group consisting of methanol, ethanol, normal propanol and isopropanol, and from 5% to 80% by weight of a liquid aromatic hydrocarbon water in an amount sufficient to effect a two phase separation.

4. A process for making a plastic coating composition comprising the steps of dissolving ethyl cellulose in a mixture comprising water-miscible lower aliphatic alcohol selected from the group consisting of methanol, ethanol, normal propanol and isopropanol and less than 80% of a liquid aromatic hydrocarbon, and thereafter adding to the ethyl cellulose solution water in an amount sufficient to effect a two phase separation resulting in a water-immiscible viscous plastic gel phase which is more cohesive than adhesive, and separating the said gel phase from the mixture.

5. A process for making a plastic mastic coating composition comprising the steps of dissolving ethyl cellulose in a mixture comprising water-miscible lower aliphatic alcohol selected from the group consisting of methanol, ethanol, normal propanol and isopropanol and from 5% to 80% by weight of liquid aromatic hydrocarbon, adding to the solution so formed aggregate filler material and finally adding water to the mixture in an amount sufficient to effect a two phase separation resulting in a water-immiscible viscous plastic gel phase which is more cohesive than adhesive, and which may be spread by means of a trowel without adhering thereto, and separating the said gel phase from the mixture.

6. A surface coating mastic comprising aggregate filler material incorporated and suspended in the plastic coating composition defined by claim 2.

References Cited in the file of this patent

UNITED STATES PATENTS

| | | |
|---|---|---|
| 1,441,143 | Carroll | Jan. 2, 1923 |
| 1,458,256 | Triwelli | June 12, 1923 |
| 1,518,417 | Stinchfield | Dec. 9, 1924 |
| 2,113,305 | Malm et al. | Apr. 5, 1938 |
| 2,544,247 | Asaff et al. | Mar. 6, 1951 |

FOREIGN PATENTS

| | | |
|---|---|---|
| 102,082 | Australia | Sept. 20, 1937 |